Patented Oct. 23, 1951

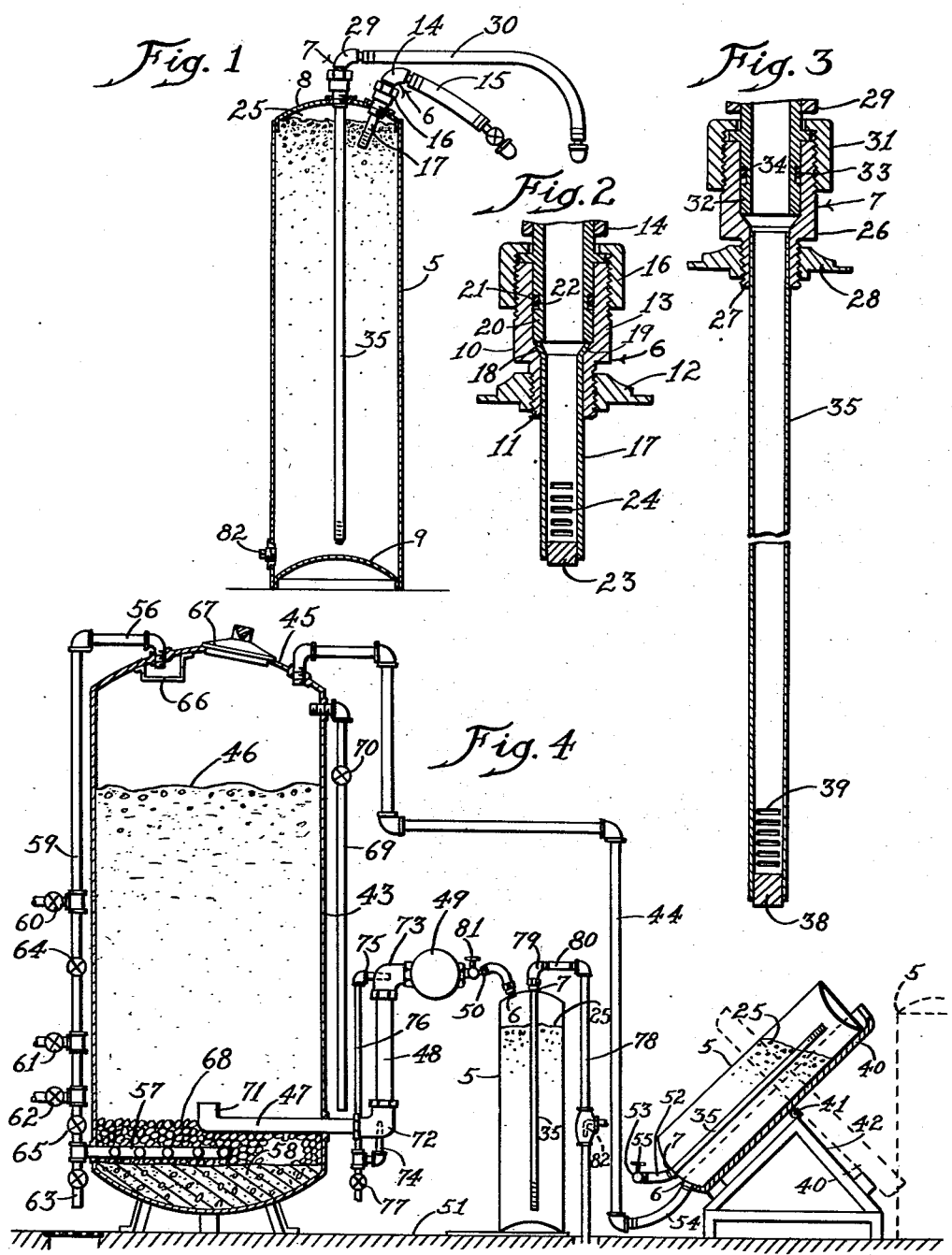

2,572,082

UNITED STATES PATENT OFFICE 2,572,082

SERVICE OR RENTAL TYPE WATER SOFTENER AND MEANS AND METHOD FOR REGENERATING SAME

James E. Welsh, Burbank, Calif.

Application February 26, 1943, Serial No. 10,994

4 Claims. (Cl. 210—24)

This invention relates to base exchange water softeners, and is more particularly concerned with what are now commonly called "service" or "rental" type water softeners, the present invention pertaining both to the novel construction of such a softener and to the novel means for and method of regenerating the same.

Various methods of regenerating service softeners have been proposed, but the two methods most widely used are what are disclosed in Culligan Patent No. 2,252,055 and Lind Patent No. 2,087,157:

In the Culligan method, the rental type softeners requiring regeneration are removed bodily from the customer's premises and taken to the central plant for regeneration in groups, the tanks being connected in series with the outlet of each tank connected to the inlet of the next tank, an amount of the brine sufficient for regenerating the total number being passed through the series. The tanks are backwashed by forcing water into the outlet to expand the zeolite and force some of it up into an auxiliary funnel secured to the inlet, and, after a certain flow estimated for satisfactorily backwashing the zeolite, suction is applied to the outlet to cause the zeolite in the funnel to return to the tank.

In the Lind method, the zeolite is in bags which are removed from the customers' rental type softener tanks and taken to the central plant where they are subjected collectively to the action of the regenerating brine.

Both of these methods have more or less serious objections. Danger of contamination is the most serious objection to Lind's method, because of the exposure of the bags of mineral and the need for the service man handling these bags at various points in the cycle. Lind's method, on the other hand, affords an advantage that the zeolite is to some extent mechanically broken up and rearranged as a result of the periodic handling, emptying, and refilling, and transporting of the bags of zeolite, so that caking and channeling common in some water softeners having permanently undisturbed zeolite beds are to some extent avoided. The Culligan method, as compared with Lind's offers less danger of contamination, because most of the zeolite is allowed to remain in the tanks, only a small amount being ejected in the backwashing and later retrieved into the tank, so that only that much zeolite is actually exposed to the air and to possible contamination.

At any rate, with Culligan's method there is no occasion for personal contact between the service man and the zeolite in the tanks, as there is, obviously, with Lind's method. However, Culligan's method does not afford any measurable advantage over the old practice of an owner regenerating the softener himself by one of the old methods, in so far as avoidance of caking and channeling is concerned, because the handling and transporting of the tanks with the zeolite in them is not apt to alter that condition to any great extent. As a result, it is questionable how large a percentage of the zeolite in Culligan's tanks is satisfactorily regenerated, assuming, as we must, that some of the zeolite adheres to the walls of the tank and some will also cake more or less, and it is only that zeolite that is loosened which wells up into the funnels fastened onto the tops of the tanks.

It is, therefore, the principal object of my invention, in the regeneration of the zeolite from a plurality of rental softeners, to avoid the objections inherent in these earlier methods. In accordance with my method, the exhausted zeolite is expelled from a plurality of rental type softener tanks under water or air pressure (or both) and caused to flow through a pipe into a large regeneration tank where it is regenerated, the zeolite being thereafter similarly returned to the tanks by water or air pressure (or both). The thorough mechanical working which the zeolite must necessarily undergo in passing through the pipes in these transfer operations alone absolutely precludes any possibility of there being any lumped or caked zeolite that will not be properly regenerated, and, of course, these transfers are only a part of the regeneration cycle, the zeolite being subjected to washing, salting, and rinsing between these passes through the pipes, in which there is further ample oportunity for the zeolite to be even more thoroughly broken up. Hence, I obtain the maximum benefit of the brine and accordingly increase the softening capacity of the zeolite per pound. Moreover, because the zeolite is not exposed to the air and is never handled by a service man at any point, this method is truly sanitary. The present method, furthermore, has many other advantages from the purely practical standpoint, as well as from the standpoint of economy, as will be pointed out more or less fully hereinafter.

The invention is also concerned with improvements in the rental softener, which make it better adapted to use and regeneration by my new method, and is further concerned with improvements in the means or apparatus employed in carrying out said method.

The invention is illustrated in the accompanying drawing, wherein—

Fig. 1 is a vertical section through a rental type water softener made in accordance with my invention;

Fig. 2 is a sectional detail of the inlet connection, on a larger scale;

Fig. 3 is a sectional detail of the outlet connection, on the same larger scale, and Fig. 4 is a view of the central regeneration plant equipment.

The same reference numerals are applied to corresponding parts throughout the views.

Referring first to Figs. 1 to 3, the rental softener of my improved design comprises a generally cylindrical tank 5, having an inlet connection 6 and an outlet connection 7, both on the top 8 of the tank. The bottom 9 has its flanged rim welded, or otherwise suitably secured, to the side walls to form a supporting base for the tank. The inlet 6 comprises a nipple 10 having a reduced end portion 11, which, as best appears in Fig. 2, is threaded into the flange 12 that is welded to the top 8 of the tank, the nipple having an enlarged outer end portion 13, which is externally threaded to permit quickly detachable connection with an elbow 14 provided on the end of a flexible conduit 15 that may be either of flexible copper tubing or rubber hose and extends from the hard water supply pipe. The elbow 14 has a union nut 16 rotatable on the end thereof to thread onto the nipple 13 for a quickly attachable and detachable connection. A tube 17 fits slidably in the nipple 10, and has a flared upper end 18 which engages a tapered seat 19 in the bore of the nipple. The nipple 20 mounted in the elbow 14 fits freely in the bore of the nipple 13 and is held in place therein by union nut 16 threaded on nipple 13. A suitable gasket ring 21 of rubber, or other compressible material, is provided in an annular groove 22 in the nipple 20 and is compressed slightly radially when forced into the bore of nipple 10, but also relies upon water pressure to compress it further against one end of the groove to prevent leakage. The tube 17 has a plug 23 closing the inner end thereof, and there are slots 24 cut in the wall of the tube near the inner end to permit passage of water freely into the upper end of the tank 5 for passage downwardly through the bed 25 of zeolite or other water softening or purifying material. With this construction, it is obvious that the inlet tube 17 may be removed easily and replaced, and this is important in the removal and replacement of the mineral 25 at the central regeneration plant. The outlet connection 7, which is clearly illustrated in Fig. 3, is of generally similar design to the inlet connection and comprises a nipple 26 having a reduced externally threaded portion 27 threading in the flange 28 that is welded to the top 8 of the tank. The enlarged outer end portion of the nipple 26 is externally threaded for connection with the elbow 29 provided on the end of another flexible conduit 30 that is connected to the service system in the home. A union nut 31 threads on nipple 26 and is rotatable on the nipple 32. The latter is mounted in elbow 29 and fits freely in nipple 26. Here again, a gasket ring 33 of rubber or other compressible material is provided in an annular groove 34 provided therefor in the nipple 32 and serves to prevent leakage at the outlet connection. A tube 35 extends from the nipple 26 down to a point near the bottom of the tank and is preferably soldered in place at its upper end in the lower end of the nipple 26. The lower end of the tube 35 has a plug 38 closing the same, and there are slots 39 in the walls of the tube near the lower end through which the softened water will pass freely although the zeolite, or other granular water softening or purifying material, forming the bed 25 will be positively retained in the tank. As will soon appear, the fact that the tube 35 extends to a point near the lower end of the tank is used to advantage in the operation of expelling the mineral 25 from the tank at the central regeneration plant. It is obvious that the inlet and outlet connections are substantially identical and parts are, therefore, interchangeable, the main difference between the two connections being that the outlet tube 35 is longer than the inlet tube 17.

Referring now to Fig. 4 showing the central regeneration plant equipment; I have shown two tanks 5, one of which is shown in position for expulsion of the zeolite under water or air pressure (or both), this tank being supported for that purpose in a cradle 40 that is hingedly mounted, as at 41, intermediate its ends on the apex of a triangular base 42 to facilitate handling, and the other (or others) of which are shown in position for refilling the same with zeolite from the regeneration tank 43 under water or air pressure (or both). The zeolite, or other granulated water softening or purifying material, forming the beds 25 is conducted from the tanks placed on the cradle 40 to the regeneration tank 43 through one or more pipes 44 which extend to the top 45 of the regeneration tank, and this tank is large enough to accommodate a bed 46 of zeolite representing any desired multiple of the zeolite capacity of a single rental softener tank 5. The zeolite in its passage through the pipe or pipes 44 to the tank 43 undergoes enough mechanical working to break up any lumps or caked zeolite, so that the bed 46 can be thoroughly cleansed by backwashing, and thereafter thoroughly regenerated by passage of brine therethrough, and thereafter thoroughly rinsed. The zeolite after regeneration in the bed 46 is conducted through pipes 47 and 48 to a manifold 49, from which it is discharged through flexible hoses 50 back into rental softener tanks 5, and here again the passage of the zeolite through these pipes and hoses involves mechanical working, which results in the complete absence of lumps of any appreciable size in the beds 25 when the softeners are returned to service. A tank 5 of exhausted zeolite in the customer's home is, of course, replaced periodically by a similar tank 5 of regenerated zeolite, and in that way the customer is always assured of a good supply of zero soft water, and inasmuch as the exchange of tanks takes only a few minutes, the soft water service is not interrupted any longer than is absolutely necessary, and far less than what is necessary in installations where the house owner attends to the regeneration of his softener himself. In both of the zeolite transfer operations from a tank 5 to the regeneration tank 43 and back again to another tank 5, it is important to note that the service man never comes into personal contact with the zeolite. In other words, this is a closed system from start to finish, and the process is therefore truly sanitary. Moreover, labor at the central regeneration plant is reduced to a minimum by virtue of the use of water or air pressure (or both) in both of the transfer operations. A multiple branched Y-connection may be provided in place of the manifold 49, providing as many discharge connections as there are hoses 50, for refilling two, three, or even more softener tanks simultaneously.

Considering first the emptying operation: The tank 5 containing exhausted zeolite to be emptied stands first to the right of the base 42, as indicated in dotted lines, and the cradle 40 is swung to the right to the dotted line position indicated to receive it. The lower end of the cradle is close enough to the floor 51 so that the operator does not have to do much lifting to place the tank on the cradle. Men are usually employed for such heavier work. The rest of the work from that point on in the central regeneration plant is so light that women and girls can take care of it easily, men being employed also to remove the refilled tanks at the other end of the cycle of regeneration. Without implying any limitation upon the application of my invention, I might add at this point that the tanks 5 are usually thirty-six inches high and about ten inches in diameter, and such a tank filled to the usual level with zeolite weighs about one hundred sixty pounds, so that when dollies are used there is not too much heavy lifting involved in the removal and replacement of tanks at the customer's house and in the hauling to and from the central regeneration plant, and in the handling of these tanks around said plant. Once the tank 5 containing exhausted zeolite is resting on the cradle 40, the woman or girl operator can easily swing it to the inverted position, shown in full lines in Fig. 4, and attach a flexible hose 52 to the outlet connection 7 to deliver water under pressure or compressed air (or both) from the supply pipe 53 through the tube 35 to what is now the upper end of the tank, whereby to expel the zeolite from the tank through another flexible hose 54 that is attached to the inlet connection 6, this hose being connected to the system of pipes 44 previously mentioned that leads to the upper end of the regeneration tank 43. The emptying operation on a tank of the size mentioned takes usually less than a minute—about forty seconds—so that it is obvious that a large number of softeners can be processed in a short time. The woman or girl operator standing to the left of the base 42 will attend to making the connections 52 and 54 with the outlet and inlet and will remove the inlet tube 17 to permit connection of the hose 54. She will open the valve 55 to admit the pressure fluid to the tank only after having completed the hose connections mentioned and will close the valve as soon as the tank has been emptied.

Considering next the regeneration of the zeolite: The regeneration tank 43 has a top pipe connection 56 and a bottom strainer system 57 disposed above the cement base 58. A vertical pipe 59 interconnects the strainer system 57 and top pipe connection 56, and has a valved brine inlet connection 60, a valved soft water inlet connection 61, a valved hard water inlet connection 62, and a valved drain connection 63. A valve 64 is provided in the vertical pipe 59 between the brine inlet 60 and soft water inlet 61, and another valve 65 is provided in the same pipe between the hard water inlet 62 and the drain connection 63. 66 is a splash plate mounted in the top of the tank under the inlet end of the pipe connection 56, and 67 is a manhole cover, the removal of which affords access to the inside of the regeneration tank for inspection, replacement, and repair of fittings.

The exhausted zeolite from a multiplicity of tanks having been discharged into the regeneration tank 43 approximately to the level indicated in Fig. 4, the first step in the regeneration is backwashing, in which hard water from the inlet connection 62 is discharged through the strainer system 57 and flows upwardly through a graveled bed 68, and thence upwardly through the zeolite, and finally out through a drain pipe 69, in which a shut-off valve 70 is provided. In that way the silt and other foreign matter that accumulated on top of the beds in the various softeners while in service is removed and the zeolite is at the same time thoroughly agitated to eliminate likelihood of its being packed too tightly when the brine is passed through it. It is well to point out that the mechanical working to which the zeolite is subjected in its passage through the pipes 44 in the transfer from the softener tanks to the regeneration tank has a tendency to break up the zeolite and thereby loosen the foreign matter that has accumulated on top of the bed. Following the backwashing, brine is introduced through the inlet connection 60 and caused to flow downwardly through the bed 46 and out through the strainer system 57 and drain connection 63 to regenerate the zeolite. Then, in order to save the softening capacity of the regenerated mineral 25, the brine is rinsed out by means of soft water delivered into the top of the tank from the soft water inlet connection 61, the rinse water containing the spent brine and the released calcium and magnesium being conducted from the bottom of the tank through the strainer system 57 to the drain 63. It is much more economical from every standpoint to regenerate the mineral from a large number of softener tanks in one bed in a large regeneration tank, as compared with attempting to regenerate the zeolite in the tanks individually or even several connected in series.

Considering next the refilling of softener tanks 5 with regenerated zeolite: The pipe 47, previously mentioned, provided for return of zeolite from the regeneration tank 43 to the softener tanks is more than large enough to carry a flow of mineral equal to the capacity of a plurality of discharge hose connections 50. This pipe 47 is disposed radially in the lower portion of the tank just above the strainer system 57, in the upper portion of the gravel bed 68, and has an upwardly directed elbow 71 on the inner end thereof substantially on the center-line of the tank. An elbow 72 connects pipes 47 and 48, and another elbow 73 connects pipe 48 with manifold 49. Nozzles 74 and 75 are provided in these two elbows connected to a common supply pipe 76, in which a shut-off valve 77 is provided. These nozzles 74 and 75 are for discharge of soft water and/or compressed air under moderate pressure, whereby to entrain the zeolite and cause it to flow from the tank 43 to the manifold 49 and thence through flexible hose connections 50 into the tanks 5 through the inlet connections 6, the outlet connections 7 meanwhile being placed in communication with a drain pipe 78 by means of a fitting 79 provided on the end of a flexible hose 80 that connects the fitting 79 to the drain pipe 78. The woman or girl operator opens a valve 81 when the two hose connections have been applied, indicated at 50 and 80, and it takes only about a minute to fill the tank 5 with zeolite to the desired level, the water and/or air used as the entraining fluid medium serving to "lubricate" the zeolite sufficiently so that it flows readily through the pipe 48, manifold 49, and hose connection 50, the excess water and/or air being discharged to the drain through pipe 78. Here again the strainer slots 39 in the lower end of the tube 35 serve to retain the zeolite while permitting escape of the water and/or air. By using soft water and/or air under pressure at 74 and 75, I avoid the objection of having the zeolite come in contact with any hard water, and thereby assure full softening capacity of the zeolite in the refilled tank. One or more tanks 5 may be refilled at the same time depending on the number of hose connections 50 and valves 81 provided on manifold 49. To insure a steady flow of zeolite into the inlet elbow 71 and avoid any danger of the zeolite packing in that vicinity, I have found it highly desirable to deliver soft water and/or air under pressure through the soft water inlet connection 61 to the bottom of the bed 46 through the strainer system 57 and gravel bed 69. This relieves the zeolite in the vicinity of the nozzle 71 of the weight of the bed above and causes the churning and loosening up of the zeolite sufficiently in the vicinity of the elbow 71 so that when the nozzles 74 and 75 are thrown into operation the suction thus created coupled up with the pressure in the tank 43, by reason of delivery thereto of soft water and/or air under pressure, is enough to insure good flow of the zeolite from the tank 43 into the tank 5. Also, I may create a reduction in pressure in the drain pipe 78 by use of an ejector nozzle 82 connected to a source of water supply under pressure and discharging toward the drain, whereby to speed up the flow of mineral from tank 43 to tank or tanks 5.

As an alternative, the softeners upon return to the central plant for regeneration may be subjected to a backwashing operation before the tanks are emptied, whereby to remove the silt and accumulated foreign matter from the tops of the beds, and thereby eliminate the necessity for backwashing the zeolite after it has been put in the regeneration tank 43. In such backwashing the inlet tube 17 is removed to permit the escape of the foreign matter and the outlet tube 32 is used for delivering the hard water into the lower end of the tank 5. If such backwashing is to be done, a freeboard space must be left in each tank 5 above the bed 25. However, if the tanks are completely filled with mineral for greater softening capacity, such backwashing is not feasible.

An alternative method of emptying the tanks 5 involves the removal of a plug 82 from the bottom portion of the tank and applying the hose connection 54 of Fig. 4, or its equivalent, to a fitting entered in the hole thus provided while the water and/or air under pressure is delivered into the top of the tank through the inlet or outlet connection 6 or 7 while the other connection is plugged. This method permits emptying tanks while they are still on the truck and, accordingly, eliminates another step involving heavy lifting. This same plug 82 can then also be removed for refilling of the tank in an upright or inverted position, as preferred, by applying the hose connection 50 of Fig. 4, or its equivalent, to the hole in the lower end portion of the tank.

A further alternative system consists in emptying the tanks 5 of exhausted mineral more or less by gravity into a first tank introducing only enough water under pressure into the softener tank 5 to lubricate the mineral in its discharge, inasmuch as the water runs out faster than the mineral. Then the mineral is either raised from the first tank by pressure to a second and higher tank, before or after regeneration, or is left at such elevation after regeneration with a view to refilling the tanks directly more or less by gravity to softener tanks brought in at a lower elevation, the regenerated mineral in either case being discharged more or less by gravity from the tank at higher elevation back into the softener tank 5, again using enough water under pressure to lubricate the mineral and facilitate the transfer. The water used for lubricating the mineral is discharged always in the direction of the desired flow of mineral, so as not only to lubricate but entrain the mineral with it, soft water being used to conserve softening capacity. Here again, the reduction in pressure in the drain pipe extending from the softener tank 5 being filled, illustrated at 82 in Fig. 4, will help to speed up the flow of mineral. In other words, the force of gravity may be utilized with or without water and/or air pressure in the movement of the mineral to and from the regeneration tank.

In conclusion, it should be apparent that I have provided a method whereby a softener can be brought into the central regeneration plant, its contents discharged, and the tank refilled with regenerated zeolite in a few minutes, thereby making the unit ready for immediate use again. Two or more regeneration tanks 43 are usually provided in a plant so that there is always one filled with regenerated zeolite from which softener tanks can be filled, while another, or others, of the regeneration tanks are in the process of regenerating another batch, or batches, of zeolite. With my improved method, the zeolite is always confined in tanks and is never exposed to likelihood of contamination. At various times, whenever considered advisable, the zeolite will be disinfected, and likewise the softener tanks.

It is believed the foregoing description conveys a good understanding of the objects and advantages of my invention. While I have illustrated and described my invention as applied to base exchange water softeners, I also mentioned water purifying material, having in mind activated carbon and other purifying materials, because I believe that such materials may be handled with the same transfer methods as have been illustrated and described herein for water softening material. Of course, backwashing and cleaning would be the only treatment required, and there would be no regeneration unless steam rejuvenation methods prove to be economically sound, or new material might be substituted for the old. In the broader claims, therefore, I have used the expression "water treating material" as referring to zeolites as well as activated carbon, for example.

I claim:

1. The method of regenerating granular water softening materials in a plurality of normally upright service tanks each having a top opening and a pipe extending into the same to a point near the bottom thereof, which comprises inverting the tanks to displace the granular material therein to the lowered upper end whereby to loosen the material therein, forcing water into the upended lower end of the tanks through the pipe extending thereinto to force the granular material therefrom out through the opening in the lowered upper end of the tank, discharging the granular material forced from the plurality of service tanks through a restricted passage to a regenerating tank having sufficient capacity to hold the charge of granular material from a plurality of said service tanks, brining and washing the combined body of granular material in the regenerating tank, and returning the regenerated granular material through a restricted passage successively to the plurality of service tanks.

2. A central station servicing apparatus for collective regeneration of individual service tanks each containing a charge of spent zeolite and having an inlet and an outlet, said apparatus comprising a closed regeneration tank having a capacity to receive and hold the spent zeolite from a plurality of such service tanks, a pipe for delivering fluid under pressure to a servicing point adjacent said regeneration tank, a zeolite transfer pipe extending from said servicing point to the upper portion of said regeneration tank, means for detachably connecting the inlet and outlet of each of said service tanks with said pipes whereby to transfer the zeolite from said service tanks through said zeolite transfer pipe to said regeneration tank under fluid pressure, valved pipes connected to the upper and lower ends of said regeneration tank for connecting said upper and lower ends with a source of water supply under pressure, a source of brine supply and a drain, whereby to permit brining and rinsing the zeolite in the regeneration tank and supplying of water under pressure thereto, a zeolite return pipe communicating with the bottom of said regeneration tank, and means for detachably connecting the inlets of said service tanks to said return pipe and for placing the same successively in communication therewith for refilling said individual service tanks with regenerated zeolite forced through said return conduit by water supplied to said regeneration tank.

3. A central station servicing apparatus for collective regeneration of individual service tanks each containing a charge of spent zeolite and having an inlet and an outlet, said apparatus comprising a closed regeneration tank having a capacity to receive and hold the spent zeolite from a plurality of such service tanks, a pipe for delivering fluid under pressure to a servicing point adjacent said regeneration tank, a zeolite transfer pipe extending from said servicing point to the upper portion of said regeneration tank, means for detachably connecting the inlet and outlet of each of said service tanks with said pipes whereby to transfer the zeolite from said service tanks through said zeolite transfer pipe to said regeneration tank under fluid pressure, valved pipes connected to the upper and lower ends of said regeneration tank for connecting said upper and lower ends with a source of water supply under pressure, a source of brine supply and a drain, whereby to permit brining and rinsing the zeolite in the regeneration tank and supplying of water under pressure thereto, a zeolite return conduit communicating with the bottom of said regeneration tank, a delivery manifold pipe connected with said return conduit, means for detachably connecting the inlets of a plurality of individual service tanks to said manifold pipe, and means for placing the individual service tanks one after the other in communication with said manifold for refilling said individual service tanks with regenerated zeolite from said regeneration tank.

4. A central station servicing apparatus for collective regeneration of individual service tanks each containing a charge of spent zeolite and having a top opening and a pipe extending into the same to a point near the bottom thereof, said apparatus comprising a closed regeneration tank having a capacity to receive and hold the spent zeolite from a plurality of such service tanks, a pipe for delivering fluid under pressure to a servicing point adjacent said regeneration tank, a zeolite transfer pipe extending from said servicing point to the upper portion of said regeneration tank, an oscillatable support mounted at said servicing point adapted to receive any one of said individual service tanks thereon to turn the same upside down to displace the zeolite therein to the lowered upper end, means for detachably connecting said fluid delivery pipe to said pipe extending into the bottom of said service tanks and said zeolite transfer pipe to the top opening thereof in upended position on said oscillatable support whereby to transfer the zeolite from said service tanks through said zeolite transfer pipe to said regeneration tank under fluid pressure, valved pipes connected to the upper and lower ends of said regeneration tank for connecting said upper and lower ends with a source of water supply under pressure, a source of brine supply and a drain, whereby to permit brining and rinsing the zeolite in the regeneration tank and supplying of water under pressure thereto, a zeolite return pipe communicating with the bottom of said regeneration tank, and means for detachably connecting the top openings of said service tanks to said return pipe and for placing the same successively in communication therewith for refilling said individual service tanks with regenerated zeolite forced through said return conduit by water supplied to said regeneration tank.

JAMES E. WELSH.

REFERENCES CITED

The following references are of record in the file of this patent:

UNITED STATES PATENTS

| Number | Name | Date |
|---|---|---|
| 1,276,629 | Duggan | Aug. 20, 1918 |
| 1,740,199 | Nordell | Dec. 17, 1929 |
| 1,763,784 | Hodkinson | June 17, 1930 |
| 1,916,367 | Green | July 4, 1933 |
| 2,087,157 | Lind | July 13, 1937 |
| 2,252,065 | Culligan | Aug. 12, 1941 |